No. 754,130. PATENTED MAR. 8, 1904.
W. L. EDDY.
CULTIVATOR.
APPLICATION FILED SEPT. 29, 1903.
NO MODEL.
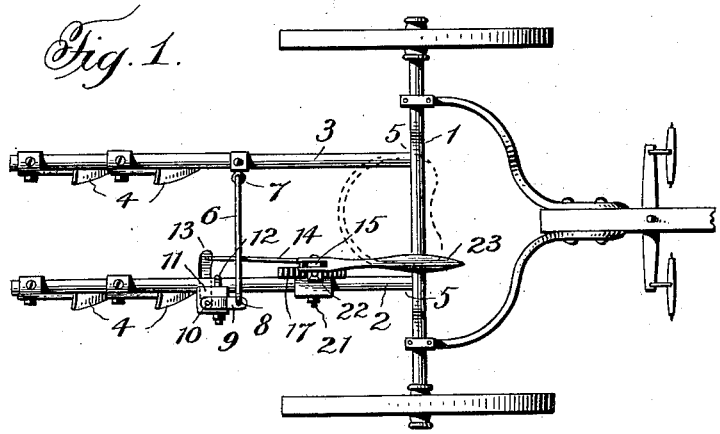
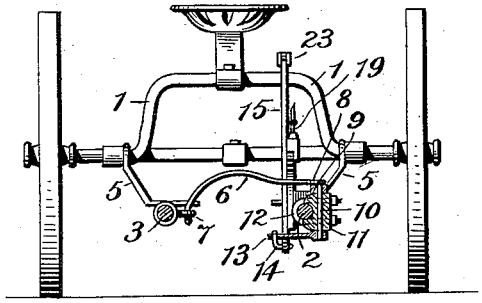
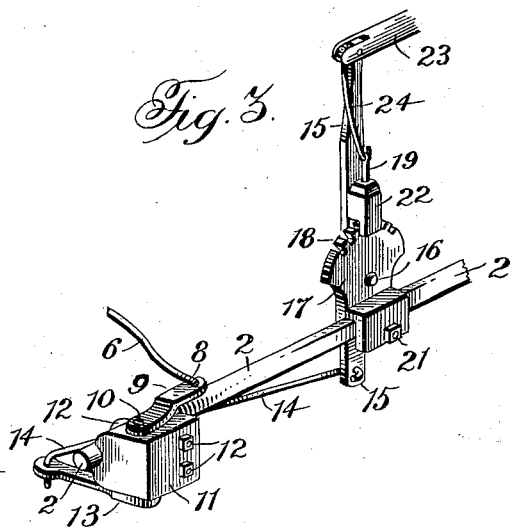
Witnesses
Jas E Hutchinson
H A Farnham
Inventor:
W. L. Eddy,
By Swift & Co.
Attorneys No. 754,130. Patented March 8, 1904.

UNITED STATES PATENT OFFICE.

WILLIAM LAFAYETTE EDDY, OF STAR, TEXAS.

CULTIVATOR.

SPECIFICATION forming part of Letters Patent No. 754,130, dated March 8, 1904.

Application filed September 29, 1903. Serial No. 175,074. (No model.)

*To all whom it may concern:*

Be it known that I, WILLIAM LAFAYETTE EDDY, a citizen of the United States, residing at Star, in the county of Mills and State of Texas, have invented new and useful Improvements in Cultivators; and I do hereby declare the following to be a full, clear, and exact description of the invention, such as will enable others skilled in the art to which it appertains to make and use the same.

The invention relates to improvements in cultivators, and has for its object to provide a simple and comparatively inexpensive device capable of ready adjustment to vary the distance between the cultivator-beams and shovels carried by the same, whereby the soil may be thrown as close to the plant as desired, thereby obviating the necessity of hoeing the rows after a cultivator has passed along the same.

With these and other objects in view the invention consists in the construction and novel arrangement of parts hereinafter described and shown, and particularly pointed out in the appended claim.

In the drawings forming part of this specification, and in which like numerals of reference designate corresponding parts, Figure 1 is a plan view of a cultivator constructed in accordance with this invention. Fig. 2 is a transverse sectional view. Fig. 3 is a detail perspective view of the adjusting device.

Referring to the drawings, 1 designates the cranked or arched axle of a cultivator, to which axle is hinged a pair of laterally-movable horizontally-swinging cultivator-beams 2 and 3, which are provided with cultivator blades or shovels 4 of any desired construction. The cultivator-beams may be hinged to the crank or arched axle at opposite sides of the crank or arch at 5 by any suitable means, and they are connected between their ends by an arched bar 6, which is adapted to straddle a row and which is suitably secured at its end 7 to the cultivator-beam 3 by a clip or any other suitable fastening device. The other end, 8, of the connecting-bar 6 is pivoted to an upper horizontal arm 9 of a vertical crank-shaft 10, which is journaled in a suitable bearing or opening of a block 11. The block 11, which is provided at its inner side with a recess to fit the cultivator-beam is secured to the same by a clip 12, and it performs a double function of a bearing-block and a clip-plate. The lower end of the crank-shaft is provided with an inwardly-extending horizontal arm 13, which is connected by a rod 14 with the lower end of an upright lever 15. The upright operating-lever 15 is fulcrumed between its ends by a bolt 16 or other suitable fastening device to a toothed segment 17, which is provided at its curved upper edge with teeth 18, adapted to be engaged by a spring-actuated dog or pawl 19, whereby the lever is secured in its adjustment. The toothed segment 17 is provided at its bottom with a yoke which straddles a beam and which is secured to the same by a bolt 21 or other suitable fastening means whereby the segment is mounted on the beam. The spring-actuated dog or pawl is guided in a casing or housing 22, secured to the lever at a point above the segment and provided at the outer side thereof with a depending lip, the segment being interposed between the lip and the lever. A latch-lever 23 is fulcrumed on the operating-lever at the top thereof and is connected with the dog or pawl by a rod 24 and is adapted to withdraw the pawl or dog from engagement with the toothed segment to permit the operating-lever to oscillate freely.

When the operating-lever is oscillated, the upper arm of the crank-shaft is oscillated and the cultivator-beams are swung horizontally and move toward or from each other, according to the direction in which the operating-lever is moved, and by this construction the cultivator-beams may be moved the desired distance apart. This will permit the operator to throw the soil an exact distance and will obviate the necessity of hoeing a row after the cultivator has passed along the same.

What I claim is—

The combination with a cultivator having laterally-movable cultivator-beams, of a bearing-block provided at its inner face with a recess to receive one of the beams, a clip securing the bearing-block to said beam, a segment having a yoke straddling the beam on which the bearing-block is mounted, a vertical crank-shaft having upper and lower arms and mounted on the bearing-block, an arched bar connecting one of the arms with the other beam, a segment provided with teeth and having a depending yoke straddling the beam on which the bearing-block is mounted, an operating-lever fulcrumed on the segment and connected with the other arm of the crank-shaft, and latch mechanism carried by the lever for engaging the segment, substantially as described.

In testimony whereof I have hereto affixed my signature in the presence of two witnesses.

WILLIAM LAFAYETTE EDDY.

Witnesses:
   J. S. EDDY,
   BERTIE MASON.